United States Patent
Jo et al.

(10) Patent No.: US 6,844,989 B1
(45) Date of Patent: Jan. 18, 2005

(54) LENS SYSTEM INSTALLED IN MOBILE COMMUNICATION TERMINAL

(75) Inventors: Yong-Joo Jo, Kyunggi-Do (KR); Young-Jun Kim, Kyunggi-Do (KR); Chan-Soo Kim, Kyunggi-Do (KR)

(73) Assignee: Samsung Electro-Mechanics Co., Ltd., Kyunggi-Do (KR)

( * ) Notice: Subject to any disclaimer, the term of this patent is extended or adjusted under 35 U.S.C. 154(b) by 0 days.

(21) Appl. No.: 10/761,453

(22) Filed: Jan. 21, 2004

(30) Foreign Application Priority Data

Aug. 13, 2003 (KR) .............................. 10-2003-0056026

(51) Int. Cl.⁷ .................... G02B 15/14; G02B 13/18; G02B 17/00; G02B 9/00; G02B 9/36
(52) U.S. Cl. ..................... 359/716; 359/735; 359/689; 359/740; 359/784
(58) Field of Search .............................. 359/716, 735, 359/715, 663, 689, 739, 740, 738, 679, 676, 784

(56) References Cited

U.S. PATENT DOCUMENTS 4,540,249 A * 9/1985 Mogami ..................... 359/680
5,071,235 A * 12/1991 Mori et al. ................. 359/692
5,087,988 A * 2/1992 Nakayama .................. 359/689
5,760,966 A * 6/1998 Tanaka et al. ............. 359/683

FOREIGN PATENT DOCUMENTS

KR 2002-64179 8/2002

* cited by examiner

Primary Examiner—Timothy Thompson
(74) Attorney, Agent, or Firm—Gottlieb, Rackman & Reisman, P.C.

(57) ABSTRACT

Disclosed is a lens system installed in a mobile communication terminal, comprising: a first lens including at least one aspherical plane and having a positive refractivity; a perforated iris separated from the first lens by a designated distance for preventing unnecessary incident light from being incident onto an optical system; a second lens separated from the perforated iris by a designated distance, including at least one aspherical plane and having a positive refractivity; and a third lens separated from the second lens by a designated distance, including at least one aspherical plane and having a negative refractivity, wherein the first lens, the perforated iris, the second lens and the third lens are arranged sequentially from a subject, and the perforated iris is located between the first lens and the second lens.

7 Claims, 5 Drawing Sheets

LENS SYSTEM INSTALLED IN MOBILE COMMUNICATION TERMINAL

BACKGROUND OF THE INVENTION

1. Field of the Invention

The present invention relates to a lens system installed in a mobile communication terminal, and more particularly to a lens system with a high performance and compact structure, which comprises a small number of lenses and is installed in a mobile communication terminal.

2. Description of the Related Art

Recently, mobile communication terminal products, in which a camera is integrally installed in a mobile communication terminal, have become popular with consumers. In such a camera, a subject is photographed using a lens attached to an image pickup device such as a CCD or a CMOS, and data of the photographed subject are recorded on a recording medium.

Further, a digital still camera, in which a still image formed by the lens is electrically accepted by the image pickup device including the CCD (hereinafter, referred to as "CCD") and then recorded by an internal memory or memory card, uses a liquid crystal monitor as a finder when photographing or as a reproducing monitor for reproducing the photographed image. Accordingly, compared with a silver halide camera, the digital still camera has advantages such as immediateness and convenience, while having a disadvantage of a lower resolution of the photographed image.

A lens system installed in a mobile communication terminal or a digital camera for photographing a subject must satisfy requirements, as follows.

Since an image pickup device has a pixel size of less than 4 $\mu$m so as to allow the camera to have a mega pixel capacity, the lens system must be designed such that it has a sufficient resolution and a size larger than the actual size of a sensor in consideration of an assembly tolerance.

Further, the lens system must have TV distortion of less than 1%. The more corrected the distortion is, the greater the deterioration in the resolution becomes. Accordingly, preferably, the TV distortion is less than 1%.

Moreover, since the amount of a marginal ray of the mobile communication terminal is affected by the angle of light being incident on the sensor and the amount of a marginal ray of the lens system, the lens system must be designed at a designated angle such that light can be incident on the sensor, thereby allowing the amount of a marginal ray of the camera to be increased.

In case that the lens system is designed at an angle smaller than the desired angle, the resolution, distortion and the length of the optical system in the lens system are deteriorated, thereby causing a problem of combining the lens system with the sensor.

In the lens system installed in the mobile communication terminal or digital camera for photographing a subject, there occur various aberrations, such as spherical aberration, astigmatism and distortion, in which the shape of an input image formed by photographing the subject is deformed by the influence of the incident light having one type of wavelength. Accordingly, the lens system must be designed such that it suppresses the occurrence of the various aberrations.

Here, chromatic aberration is a failure of a lens or spherical mirror to focus particles of different energies to the same point on an axis based on the wavelength of light when the lens or spherical mirror forms an image of a subject. Spherical aberration generally means other aberrations except for the above chromatic aberration, and strictly means aberration due to the failure of a lens to focus particles at different lateral distances from the axis thereof to the same point longitudinally on the axis, i.e., for a converging lens and particles incident upon the lens parallel to the axis, particles farther from the axis are focused nearer the lens than particles closer to the axis.

Further, distortion is a failure of a lens, in which a straight line of a subject is bent to form an image. In the formed image, the straight line is bent inwards like a spool or outwards like a wine barrel. The distortion occurs when the magnification of the subject is in proportion to the distance, while the formed image is not in proportion to the distance.

Moreover, astigmatism, widely speaking, is one of the spherical aberrations, in which an image on an object space separated from an axis is not converged into a complete point, but diverged in a ring-like or radial shape.

Korean Patent Application No. 2002-0005279 discloses a lens system designed such that it satisfies the above-described requirements. As shown in FIG. 1, the lens system disclosed by this application comprises a perforated iris STO arranged closest to a subject, a first lens group LG1, a second lens group LG2 and a third lens group LG3, which are sequentially arranged from the subject. The first lens group LG1 includes a first lens L1 having a positive refractivity and a second lens L2 having a negative refractivity attached or separated from the first lens. The second lens group LG2 includes a third lens L3 having a positive refractivity and including at least one aspherical refractive plane. The third lens group LG3 includes a fourth lens L4 having a negative refractivity and including at least one aspherical refractive plane. Further, this application discloses the prior art of a conventional camera lens.

That is, the lens system in accordance with Korean Patent Application No. 2002-0005279 comprises the first lens group LG1 having a high positive power, the second lens group LG2 having a positive power, and the third lens group LG3 having a low negative power, thus obtaining a long-focus type optical power arrangement in order of the positive power, the positive power and the negative power. Further, in order to correct chromatic aberration, achromatism is achieved by the first lens group LG1 having the comparatively high power. Accordingly, the first lens group LG1 serves to mainly correct spherical aberration, coma-aberration and chromatic aberration generated around an optical axis, and the second and third lens groups LG2 and LG3 serve to correct distortion, i.e., non-axial aberration, and to maintain good tele-centricity.

As described above, the conventional lens system employs a designated number of lenses, that is, four lenses, thereby increasing the volume of an optical system, and cost and time taken to perform a complicated assembly process.

Further, the perforated iris STO of the conventional lens system is arranged closest to the subject, thereby having a limit in shortening the length of the optical system employing this lens system. Accordingly, using the above-described conventional lens system, it is difficult to manufacture a small-sized mobile communication terminal having a size of less than predetermined dimensions.

SUMMARY OF THE INVENTION

Therefore, the present invention has been made in view of the above problems, and it is an object of the present invention to provide a lens system with a high performance and compact structure, which comprises a small number of lenses and is installed in a mobile communication terminal.

In accordance with the present invention, the above and other objects can be accomplished by the provision of a lens system installed in a mobile communication terminal, comprising: a first lens including at least one aspherical plane and having a positive refractivity; a perforated iris separated from the first lens by a designated distance for preventing unnecessary incident light from being incident onto an optical system; a second lens separated from the perforated iris by a designated distance, including at least one aspherical plane and having a positive refractivity; and a third lens separated from the second lens by a designated distance, including at least one aspherical plane and having a negative refractivity, wherein the first lens, the perforated iris, the second lens and the third lens are arranged sequentially from a subject, and the perforated iris is located between the first lens and the second lens.

Preferably, the first lens of the lens system may satisfy the following expression (1) so as to determine a power arrangement of the optical system employing the lens system.

$$0.5 < f1/f < 3.5 \quad (1)$$

Further, preferably, the first lens of the lens system may satisfy the following expression (2) so as to define a shape thereof for preventing spherical aberration and distortion from occurring in the optical system.

$$0.3 < r1/f < 1.0 \quad (2)$$

Here, f1 is a focal distance of the first lens, f is a focal distance of the entire optical system, and r1 is a radius of curvature of a first aspherical plane of the first lens.

Preferably, the second lens of the lens system may satisfy the following expression (3) so as to distribute power set by the first lens of the optical system employing the lens system.

$$0.4 < f2/f < 3.5 \quad (3)$$

Further, preferably, the second lens of the lens system may satisfy the following expression (4) so as to define a shape thereof for correcting spherical aberration occurring in the optical system and obtaining a good incident angle of light.

$$0.2 < r4/f < 1.0 \quad (4)$$

Here, f2 is a focal distance of the second lens, f is a focal distance of the entire optical system, and r4 is a radius of curvature of a fourth aspherical plane of the second lens.

Preferably, the third lens of the lens system may satisfy the following expression (5) so as to reduce an angle of incident light inputted from the upper side of the optical system by means of the negative power for setting the amount of a marginal ray of a camera to be in a good degree and to define a shape thereof for preventing the occurrence of aberrations in the optical system.

$$0.3 < |f3/f| < 3.5 \quad (5)$$

Further, preferably, the third lens of the lens system may satisfy the following expression (6) so as to define a shape thereof for correcting distortion and spherical aberration occurring in the optical system.

$$1.0 < r6/f < 3.0 \quad (6)$$

Here, f3 is a focal distance of the third lens, f is a focal distance of the entire optical system, and r6 is a radius of curvature of a sixth aspherical plane of the third lens.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
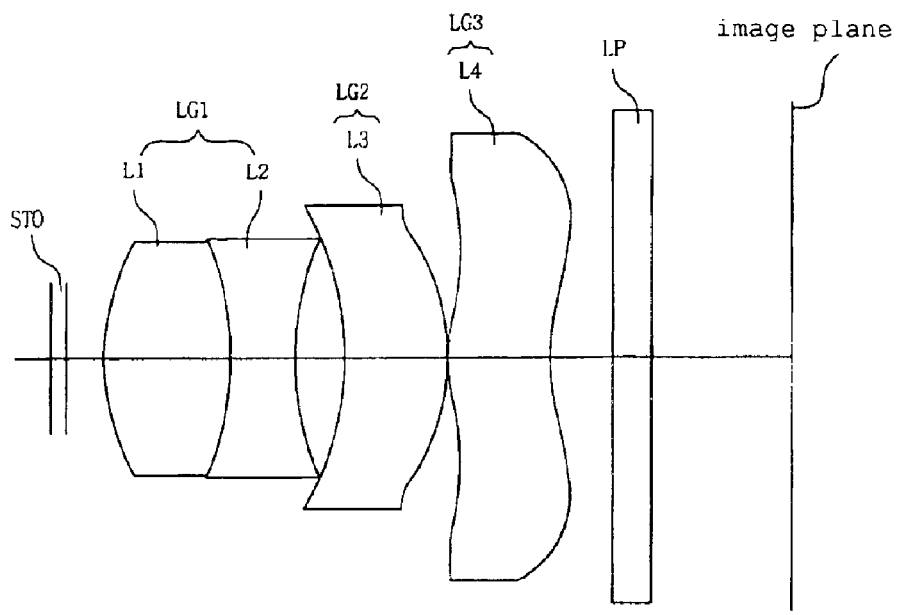
FIG. 1 is a schematic view of a conventional lens system.
Figure 2:
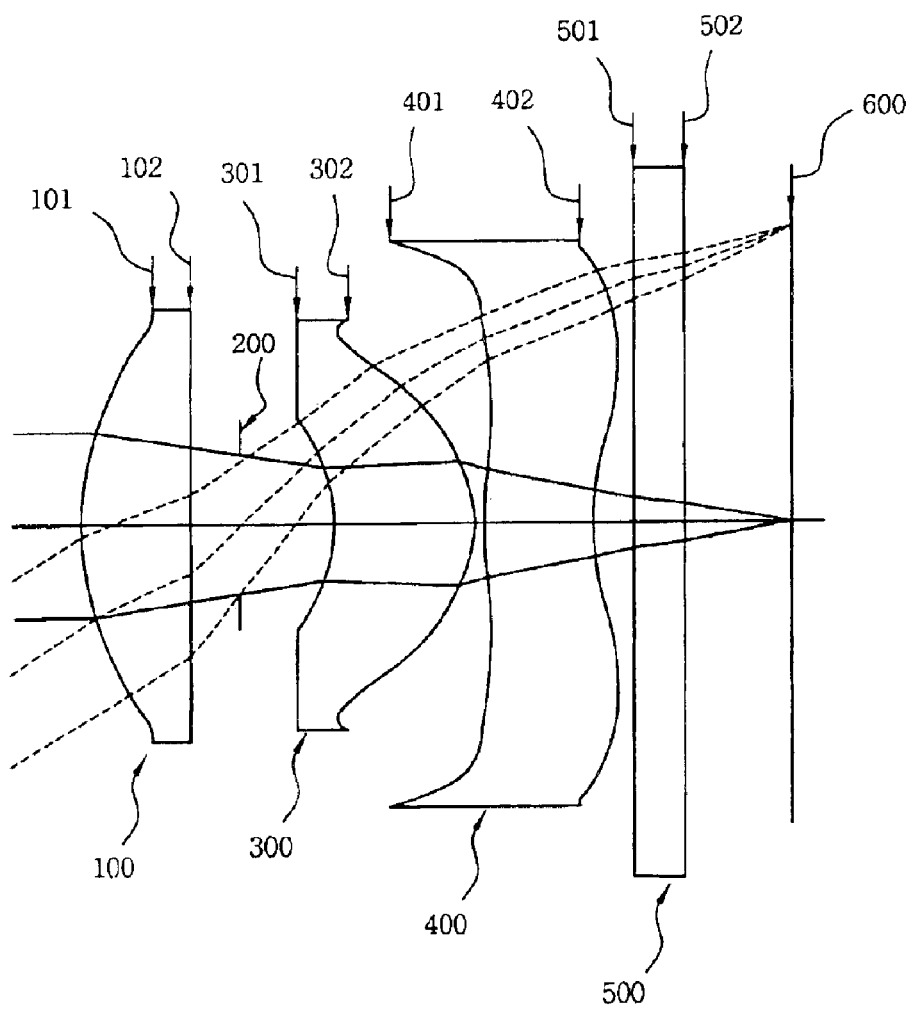
FIG. 2 is a schematic view of a lens system installed in a mobile communication terminal in accordance with the present invention.
Figure 3:
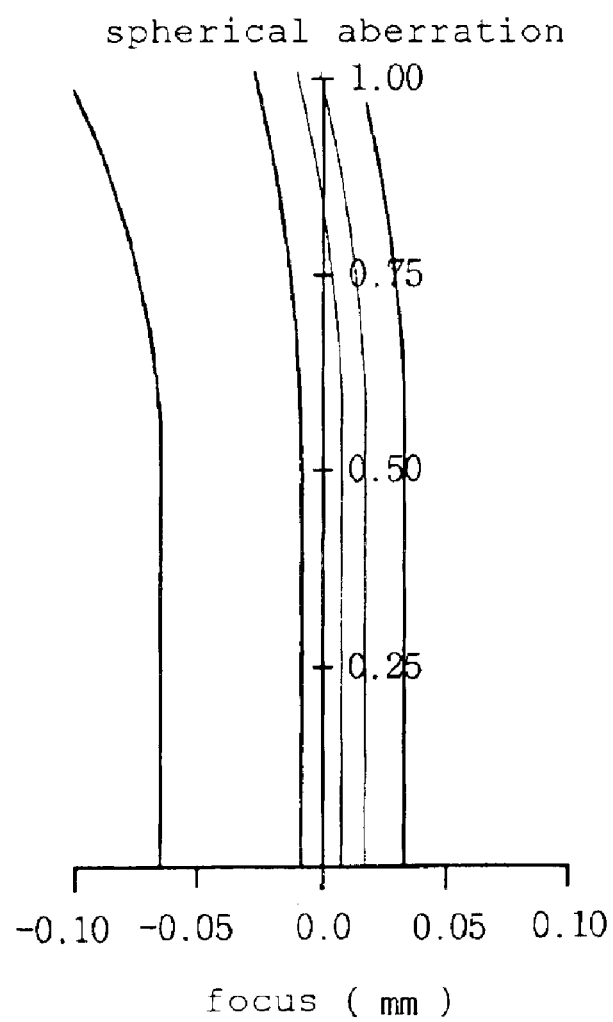
FIG. 3 is a graph illustrating spherical aberration occurring in the lens system installed in the mobile communication terminal in accordance with the present invention.
Figure 4:
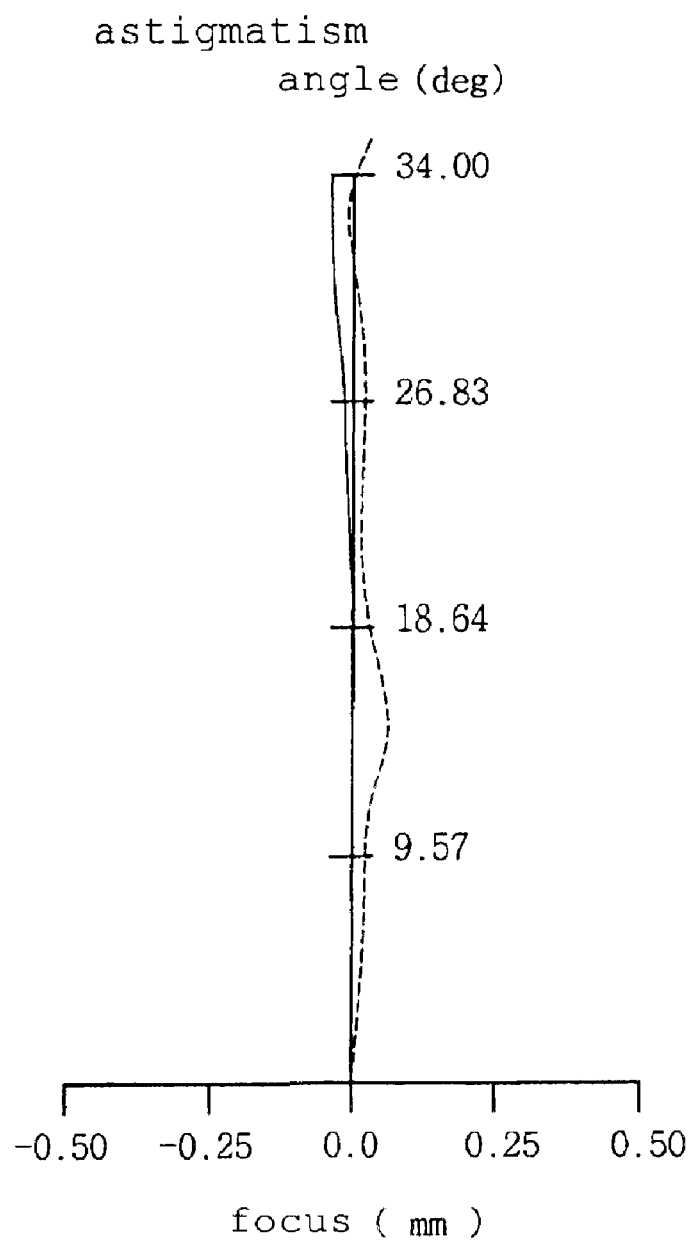
FIG. 4 is a graph illustrating astigmatism occurring in the lens system installed in the mobile communication terminal in accordance with the present invention.
Figure 5:
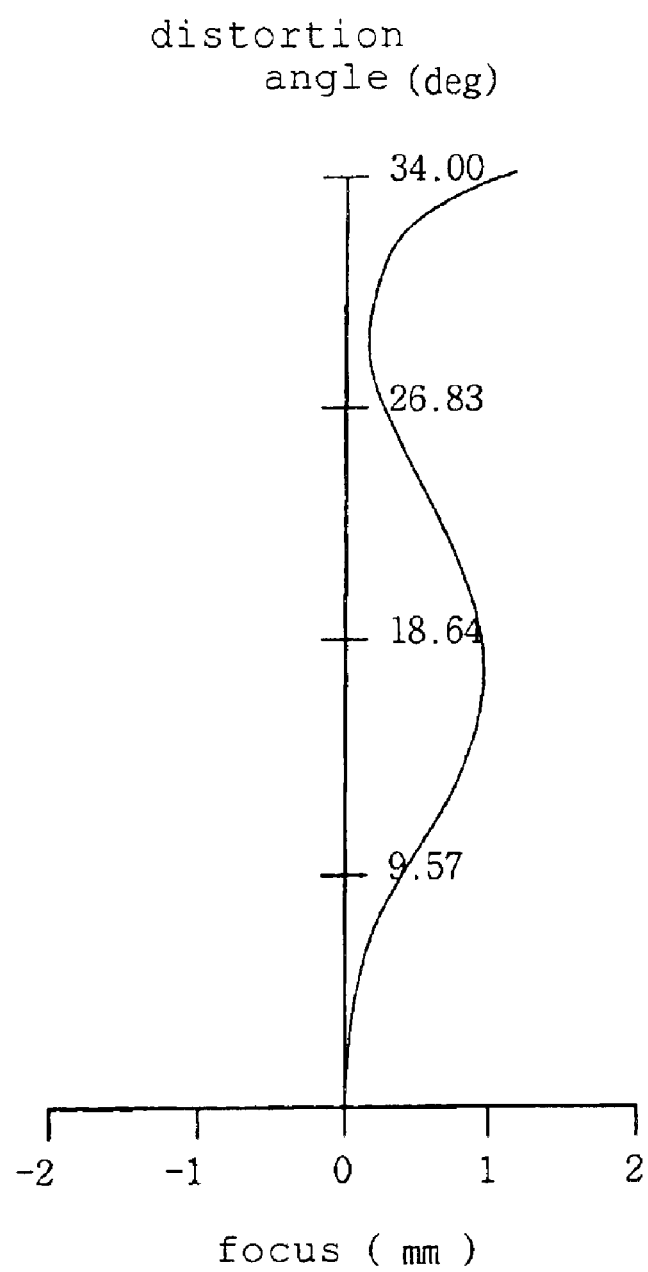
FIG. 5 is a graph illustrating distortion occurring in the lens system installed in the mobile communication terminal in accordance with the present invention.

FIG. 2 is a schematic view of a lens system installed in a mobile communication terminal in accordance with the present invention. FIG. 3 is a graph illustrating spherical aberration occurring in the lens system installed in the mobile communication terminal in accordance with the present invention. FIG. 4 is a graph illustrating astigmatism occurring in the lens system installed in the mobile communication terminal in accordance with the present invention. FIG. 5 is a graph illustrating distortion occurring in the lens system installed in the mobile communication terminal in accordance with the present invention.

Hereinafter, a constitution of the lens system of the present invention will be described in detail with reference to FIG. 2.

As shown in FIG. 2, the lens system of the present invention comprises a first lens 100 having positive refractivity, a perforated iris 200, a second lens 300 having positive refractivity, and a third lens 400 having negative refractivity, which are sequentially arranged from the position of an object. Thereby, the optical system of the lens system has an optical power arrangement in order of positive, positive and negative modes.

Further, in order to form a minimized and compact structure of the lens system of the present invention, the perforated iris 200 is disposed between the first lens 100 and the second lens 200.

Hereinafter, with reference to Table 1, parameters of respective components of the lens system will be described in detail.

Here, Table 1 is a list containing radiuses of curvature, thicknesses/distances and refractivities of the first lens 100, the perforated iris 200, the second lens 300, the third lens 400, an IR (infrared) filter 500 and a sensor plane 600 of the lens system of the present invention.

As shown in Table 1, the lens system of the present invention has a focal distance of 4.2 mm, $F_{no}$ of 2.8, and a field angle of 62° of the entire optical system.

TABLE 1

F: 4.2
F_no: 2.8
Field angle: 62°

| Lens No. | Lens plane No. | Radius of curvature (mm) | Thickness and distance (nm) | refractivity |
|---|---|---|---|---|
| First lens | First lens plane | 2.34682 | 0.895907 | 1.53 |
|  | Second lens plane | 16.88371 | 0.448032 |  |
| Perforated iris |  | ∞ | 0.819316 |  |
| Second lens | Third lens plane | −1.48051 | 1.207942 | 1.53 |
|  | Fourth lens plane | −0.97330 | 0.086856 |  |
| Third lens | Fifth lens plane | 5.14367 | 0.914825 | 1.53 |
|  | Sixth lens plane | 1.44082 | 0.345137 |  |
| IR filter | First filter plane | ∞ | 0.434260 | 1.51 |
|  | Second filter plane | ∞ | 0.958704 |  |
| Image plane |  | ∞ | 0.0 |  |

The first lens 100 of the lens system includes a first aspherical lens plane 101 having a radius of curvature of 2.34682(mm), a thickness of 0.895907(mm) and a positive refractivity of 1.53(n), and a second aspherical lens plane 102 having a radius of curvature of 16.88371(mm), a thickness of 0.448032(mm) and a positive refractivity of 1.53(n).

The aspherical coefficient of each of the first aspherical lens plane 101 and the second aspherical lens plane 102 of the first lens 100 is calculated by the below aspherical equation.

That is, on the assumption that a Z axis of each of the first aspherical lens plane 101 and the second aspherical lens plane 102 of the first lens 100 is extended along an optical axis, and a Y axis of each of the first aspherical lens plane 101 and the second aspherical lens plane 102 of the first lens 100 is extended along a direction perpendicular to the optical axis, the aspherical coefficient of each of the first aspherical lens plane 101 and the second aspherical lens plane 102 of the first lens 100 is obtained by the below aspherical equation.

$$z = \frac{(CURV)Y^2}{1+(1-(1+K)(CURV)^2 Y^2)^{1/2}} + (A)Y^4 + (B)Y^6 + (C)Y^8 + (D)Y^{10} + (E)Y^{12} + (F)Y^{14} + (G)Y^{16} + (H)Y^{18} + (J)Y^{20}$$

Here, the shape of each of the first and second aspherical lens planes 101 and 102 of the first lens 100 shown in FIG. 2 is determined by a CURV value, which is a reciprocal number of the radius of curvature of each of the first and second aspherical lens planes 101 and 102, constant values of A~J to each of the first and second aspherical lens planes 101 and 102, and an Y value representing the height of the first lens 100.

TABLE 2

| Lens No. | Aspherical plane No. | CURV | Constant of aspherical plane | |
|---|---|---|---|---|
| First lens | First lens plane | 0.42610852 | K: −0.092277 | A: 2.84286E−03 |
|  |  |  | B: −1.19964E−03 | C: 1.60903E−03 |
|  |  |  | D: −1.07331E−03 | E: 0.00000E+00 |
|  |  |  | F: 0.00000E+00 | G: 0.00000E+00 |
|  |  |  | H: 0.00000E+00 | J: 0.00000E+00 |
|  | Second lens plane | 0.05922869 | K: 165.039004 | A: −1.31103E−04 |
|  |  |  | B: −9.95622E−03 | C: 2.11392E−03 |
|  |  |  | D: −1.63538E−03 | E: 0.00000E+00 |
|  |  |  | F: 0.00000E+00 | G: 0.00000E+00 |
|  |  |  | H: 0.00000E+00 | J: 0.00000E+00 |

Here, the first lens 100 includes at least one aspherical plane having a positive refractivity, and functions to set the power arrangement of the optical system.

That is, the first lens 100 is designed such that it satisfies the below expression (1), thereby satisfying the power arrangement of the optical system employing the lens system of the present invention and obtaining good aberration properties.

$$0.5 < f1/f < 3.5 \tag{1}$$

Here, f1 denotes a focal distance of the first lens 100, and f denotes a focal distance of the entire optical system.

In case that the value of f1/f of the first lens 100 is more than the upper limit of the expression (1), the first lens 100 does not satisfy the power arrangement of the optical system, thereby allowing the power arrangements of the second and third lens 300 and 400 to be changed such that good aberration properties are not obtained.

Further, the first lens 100 is designed such that it satisfies the below expression (2), thereby having a designated shape such that it prevents spherical aberration and distortion occurring in the optical system employing the lens system of the present invention.

$$0.3 < r1/f < 1.0 \tag{2}$$

Here, r1 denotes a radius of curvature of the first aspherical plane 101 of the first lens 100, and f denotes the focal distance of the entire optical system.

In case that the value of r1/f of the first lens 100 is more than the upper limit or less than the lower limit of the expression (2), the spherical aberration and distortion of the optical system are deteriorated, thereby preventing the second and third lenses 300 and 400 from correcting the spherical aberration and distortion.

The perforated iris 200 serves to remove unnecessary incident light, which is incident onto the optical system. As shown in Table 1, the perforated iris 200 has a planar shape having a radius of curvature of ∞ and a thickness of 0.819316(mm).

Further, the perforated iris 200 is arranged between the first lens 100 and the second lens 300, thereby serving to effectively correct distortion occurring due to the above unnecessary incident light in the optical system employing the lens system of the present invention.

As shown in Table 1, the second lens 300 of the lens system includes a third aspherical lens plane 301 having a radius of curvature of −1.48051(mm), a thickness of 1.207942(mm) and a positive refractivity of 1.53(n), and a fourth aspherical lens plane 302 having a radius of curvature of −0.97330(mm), a thickness of 0.086956(mm) and a positive refractivity of 1.53(n).

The aspherical coefficient of each of the third aspherical lens plane 301 and the fourth aspherical lens plane 302 of the second lens 300 is calculated by the above-described aspherical equation.

Here, a constant of CURV, adapted to obtain the aspherical coefficient for defining the shape of the second lens 300 including the third and fourth aspherical planes 301 and 302, denotes a reciprocal number of the radius of curvature of each of the third and fourth aspherical lens planes 301 and 302, and A~J are constants of each of the third and fourth aspherical lens planes 301 and 302. These constants are shown in below Table 3.

TABLE 3

| Lens No. | Aspherical plane No. | CURV | Constant of aspherical plane | |
|---|---|---|---|---|
| Second lens | Third lens plane | −0.67544293 | K: 0.847783 | A: −5.21520E−04 |
| | | | B: −1.32219E−01 | C: 1.13038E−01 |
| | | | D: 4.03799E−02 | E: 0.00000E+00 |
| | | | F: 0.00000E+00 | G: 0.00000E+00 |
| | | | H: 0.00000E+00 | J: 0.00000E+00 |
| | Fourth lens plane | −1.02742903 | K: −0.828542 | A: 4.63286E−02 |
| | | | B: −3.37900E−02 | C: −4.21514E−03 |
| | | | D: 7.14404E−03 | E: 0.00000E+00 |
| | | | F: 0.00000E+00 | G: 0.00000E+00 |
| | | | H: 0.00000E+00 | J: 0.00000E+00 |

Here, the second lens 300 includes at least one aspherical plane having a positive refractivity, and functions to distribute the power of the optical system.

That is, the second lens 300 is designed such that it satisfies the below expression (3), thereby distributing the power of the optical system employing the lens system of the present invention and correcting spherical aberration and coma-aberration.

$$0.4 < f2/f < 3.5 \quad (3)$$

Here, f2 denotes a focal distance of the second lens 300, and f denotes the focal distance of the entire optical system.

In case that the first lens 100 of the lens system has excessive power, aberration properties such as spherical aberration and coma-aberration are apt to be deteriorated.

In order to prevent the deterioration of the aberration properties of the optical system due to the excessive power of the first lens 100, the second lens 300 is designed such that it satisfies the above expression (3). Thereby, the second lens 300 distributes the excessive power set by the first lens 100, thus correcting aberration properties such as spherical aberration and coma-aberration occurring in the optical system.

Here, the coma-aberration is a failure of a lens in which an image is not clearly formed but has a comet-like shape to be dimly seen from a central point in case that a subject or an optical source is not located on a main axis and the incident light is oblique to the lens in which the spherical aberration is corrected. Since light emitted from one point out of an optical axis of the optical system is not converged into one image point, the coma-aberration occurs.

Further, the second lens 300 is designed such that it satisfies the below expression (4), thereby defining a shape of the lens such that it prevents spherical aberration and astigmatism on an image plane occurring in the optical system employing the lens system of the present invention.

$$0.2 < r4/f < 1.0 \quad (4)$$

Here, r4 denotes a radius of curvature of the fourth aspherical plane 302 of the second lens 300, and f denotes the focal distance of the entire optical system.

In case that the value of r4/f of the second lens 300 is more than the upper limit and less than the lower of the expression (4), there occur the spherical aberration of the optical system and astigmatism on the image plane.

As shown in Table 1, the third lens 400 of the lens system includes a fifth aspherical lens plane 401 having a radius of curvature of 5.14367(mm), a thickness of 0.914825(mm) and a negative refractivity of 1.53(n), and a sixth aspherical lens plane 402 having a radius of curvature of 1.44082(mm), a thickness of 0.345137(mm) and a negative refractivity of 1.53(n).

The aspherical coefficient of each of the fifth aspherical lens plane 401 and the sixth aspherical lens plane 402 of the third ens 400 is calculated by the above-described aspherical equation.

Here, the constant of CURV, adapted to obtain the aspherical coefficient for defining the shape of the third lens 400 including the fifth and sixth aspherical planes 401 and 402, denotes a reciprocal number of the radius of curvature of each of the fifth and sixth aspherical lens planes 401 and 402, and A~J are constants of each of the fifth and sixth aspherical lens planes 401 and 402. These constants are shown in below Table 4.

TABLE 4

| Lens No. | Aspherical plane No. | CURV | Constant of aspherical plane | |
|---|---|---|---|---|
| Third lens | Fifth lens plane | 0.19441386 | K: −37.456116 | A: −5.80697E−02 |
| | | | B: 1.50954E−02 | C: 1.99446E−04 |
| | | | D: −5.08825E−04 | E: 1.15554E−05 |
| | | | F: 0.00000E+00 | G: 0.00000E+00 |
| | | | H: 0.00000E+00 | J: 0.00000E+00 |
| | Sixth lens plane | 0.69404903 | K: −7.442151 | A: −5.49844E−02 |
| | | | B: 9.04581E−03 | C: −1.34010E−03 |
| | | | D: 1.92781E−04 | E: −1.92658E−05 |
| | | | F: 0.00000E+00 | G: 0.00000E+00 |
| | | | H: 0.00000E+00 | J: 0.00000E+00 |

Here, the third lens 400 includes at least one aspherical plane having a negative refractivity, and functions to reduce an incident angle of light inputted from the upper side of the optical system.

That is, the third lens 400 is designed such that it satisfies the below expression (5), thereby reducing the angle of light, which is incident from the upper side of the optical system by means of the positive power of each of the first and second lenses 100 and 300, using the negative power of the third lens 400, and setting the amount of a marginal ray of a camera to be in a good degree.

$$0.3 < f3/f < 3.5 \quad (5)$$

Here, f3 denotes a focal distance of the third lens 400, and f denotes the focal distance of the entire optical system.

In case that the value of f3/f of the third lens 400 is out of the above range, the incident angle of light is excessively decreased and the length of the optical system employing the lens system of the present invention is lengthened, thereby allowing distortion to occur. Further, in this case, the amount of the marginal ray of the camera is reduced, thereby deteriorating resolution.

Further, the third lens 400 is designed such that it satisfies the below expression (6), thereby defining a shape of the lens such that it corrects the aberration properties, more specifically distortion and spherical aberration occurring in the optical system employing the lens system of the present invention.

$$1.03 < r6/f < 3.0 \quad (6)$$

Here, r6 denotes a radius of curvature of the sixth aspherical plane 402 of the third lens 400, and f denotes the focal distance of the entire optical system.

In case that the value of r6/f of the third lens 400 is more than the upper limit, since it is difficult to form the sixth aspherical plane 402 of the third lens 400, the aberration properties cannot be corrected by other lenses, i.e., the first and second lenses 100 and 300.

Further, in case that the value of r6/f of the third lens 400 is less than the lower limit, characteristics of the distortion and the spherical aberration occurring in the optical system employing the lens system of the present invention are deteriorated. Accordingly, in this case, it is impossible to correct the aberration properties.

The lens system of the present invention is designed such that it satisfies the below expression (7), thereby shortening the length of the optical system and defining the length of the lens system such that the lens system can be installed in a mobile communication terminal such as a mobile phone or a PDA.

$$oal/f<2.0 \tag{7}$$

Here, oal denotes a distance from the first lens plane 101 of the first lens 100 to a sensor plane, and f denotes the focal distance of the entire optical system.

In case that the value of oal/f of the lens system I more than the upper limit, the length of the optical system employing the lens system is excessively increased. Thereby, the lens system cannot be installed in a mobile communication terminal such as a mobile phone or a PDA.

On the other hand, in case that the value of oal/f of the lens system is less than the lower limit, the length of the optical system employing the lens system is decreased, but the lens system has a shape which cannot be manufactured practically.

The IR filter 500 serves to filter a red wavelength inputted through the optical system employing the lens system of the present invention, thereby protecting the sensor plane (image plane), which is sensitive to infrared wavelengths. As shown in Table 1, the IR filter 500 includes a first filter plane 501 having a planar shape having a radius of curvature of ∞, a thickness of 0.434280(mm) and a refractivity of 1.51(n), and a second filter plane 502 having a planar shape having a radius of curvature of ∞, a thickness of 0.958704(mm) and a refractivity of 1.51(n).

The image plane serves to form an image of a subject, inputted through the optical system, thereon. As shown in Table 1, the image plane has a planar shape having a radius of curvature of ∞, and a thickness of 0.

In case that the image plane is exposed to a designated wavelength, particularly infrared wavelengths, the image plane is deteriorated. In order to prevent the deterioration of the image plane due to the infrared wavelengths, as described above, the IR filter 500 is adapted to filter the infrared wavelengths.

As apparent from the above description, the present invention provides a lens system with a high performance and compact structure, which comprises a small number of lenses and is installed in a mobile communication terminal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A lens system installed in a mobile communication terminal, comprising:
   a first lens including at least one aspherical plane and having a positive refractivity;
   a perforated iris separated from the first lens by a designated distance for preventing unnecessary incident light from being incident onto an optical system;
   a second lens separated from the perforated iris by a designated distance, including at least one aspherical plane and having a positive refractivity; and
   a third lens separated from the second lens by a designated distance, including at least one aspherical plane 15 and having a negative refractivity;
   wherein the first lens, the perforated iris, the second lens and the third lens are arranged sequentially from a subject, and the perforated iris is located between the first lens and the second lens; and
   wherein the first lens satisfies the following expression (1) in terms of Dower for obtaining good aberration characteristics of the optical system, and the following expression (2) so as to define a shape thereof for preventing spherical aberration and distortion from occurring in the optical system;

$$0.5<f1/f<3.5 \tag{1}$$

$$0.3<r1/f<1.0 \tag{2}$$

here, f1 is a focal distance of the first lens, f Is a focal distance of the entire optical system, and r1 is a radius of curvature of a first aspherical plane of the first lens.

2. The lens system as set forth in claim 1, further comprising an IR (infrared) filter separated from the third lens by a designated distance for filtering infrared wavelengths incident onto the optical system so as to protect an image plane from the infrared wavelengths.

3. The lens system as set forth in claim 1, wherein the first lens is a plastic lens.

4. The lens system as set forth in claim 1,
   wherein the second lens satisfies the following expression (3) in terms of power for correcting aberrations of the optical system, and the following expression (4) so as to define a shape thereof for correcting spherical aberration occurring in the optical system and obtaining a good incident angle of light, $$0.4<f2/f<3.5 \tag{3}$$

$$0.2<r4/f<1.0 \tag{4}$$

here, f2 is a focal distance of the second lens, f is a focal distance of the entire optical system, and r4 is a radius of curvature of a fourth aspherical plane of the second lens.

5. The lens system as set forth in claim 4,
wherein the second lens is a plastic lens.

6. The lens system as set forth in claim 1,
   wherein the third lens satisfies the following expression (5) in terms of power for reducing an angle of incident light inputted from the upper side of the optical system, and the following expression (6) so as to define a shape thereof for correcting distortion and spherical aberration occurring in the optical system, $$0.3<|f3/f|<3.5 \tag{5}$$

$$1.0<r6/f<3.0 \tag{6}$$

here, f3 is a focal distance of the third lens, f is a focal distance of the entire optical system, and r6 is a radius of curvature of a sixth aspherical plane of the third lens.

7. The lens system as set forth in claim 6,
wherein the third lens is a plastic lens.

* * * * *